United States Patent [19]

Betts, Jr. et al.

[11] Patent Number: 5,074,778
[45] Date of Patent: Dec. 24, 1991

[54] PIZZA CRUST DOUGH FORMING DIE ASSEMBLY

[75] Inventors: David E. Betts, Jr., Pataskala; Thomas O. Theado, Columbus, both of Ohio

[73] Assignee: Pizza Systems, Inc., Pataskala, Ohio

[21] Appl. No.: 611,035

[22] Filed: Nov. 8, 1990

[51] Int. Cl.$^5$ .................................... B29C 43/02
[52] U.S. Cl. ....................... 425/394; 99/349; 99/432; 425/383; 425/398; 425/412
[58] Field of Search ............... 99/349, 432, 433, 430, 99/DIG. 15; 425/292, 408, 394, 398, 383, 423, 412; 426/496, 502, 283, 391; 264/293

[56] References Cited

U.S. PATENT DOCUMENTS

| | | | |
|---|---|---|---|
| 277,809 | 5/1883 | Taylor | 425/408 |
| 1,880,858 | 10/1932 | Davis | 264/293 |
| 2,127,404 | 8/1938 | Gullich | 425/408 |
| 3,045,284 | 7/1962 | Peras | 425/292 |
| 3,256,375 | 6/1966 | Bolelli et al. | 425/292 |
| 3,912,438 | 10/1975 | Padovani | 425/292 |
| 3,963,402 | 6/1976 | Berta | 425/398 |
| 4,303,677 | 12/1981 | De Acetis | 426/502 |
| 4,464,405 | 8/1984 | De Christopher | 426/496 |

FOREIGN PATENT DOCUMENTS 1779712 9/1971 Fed. Rep. of Germany.

Primary Examiner—Jay H. Woo
Assistant Examiner—William J. Matney, Jr.
Attorney, Agent, or Firm—Francis T. Kremblas, Jr.

[57] ABSTRACT

A dough forming die assembly for the manufacture of machine-made pizza crusts in cooperation with a pizza pan having a generally circular central portion surrounded by upwardly sloping walls joining a horizontal rim. The dough forming die is mounted to a vertically movable base and provided with a generally planar face portion having a surrounding recessed rim. The outer wall of said rim is provided with a downwardly extending thin lip adapted to engage the upper portion of said sloping walls of said pan. A cylindrical, ring-shaped sealing member is mounted to the base for limited slidable movement relative to said die between a raised position and a lowered position engaging said pan and slideably engages the outer wall of said rim. The sealing ring includes a bottom edge provided with a radius forming a downwardly extending thin lip on the inner wall of said bottom edge conformed to sealingly engage the lip on the recesses of said die and the sloping walls of said pan to confine the pizza dough between said recess of said die and the sloping walls of said pan.

1 Claim, 5 Drawing Sheets

PIZZA CRUST DOUGH FORMING DIE ASSEMBLY

TECHNICAL FIELD

The present invention relates to pizza crust dough forming equipment and particularly to an improved dough forming die assembly.

BACKGROUND ART

Mass production of pizza crusts is an old and well-known art. The machines employ a dough forming die assembly to press a measured portion of dough placed in a predetermined sized pizza pan to form a pizza crust of a desired shape. Typically the die assembly includes, a base carrying a die face and a sealing or punch ring which is vertically reciprocated via a piston and cylinder arrangement toward and away from an underlying pizza pan loaded with a given quantity of dough. Each reciprocal cycle of the piston assembly constitutes a forming cycle and another dough loaded pan replaces the pan in which the dough has been formed during the prior cycle.

The degree of automation in crust forming process may vary from the fully automated steps from mixing to packaging or to less automated processes requiring more manually handling of the various steps prior to or after the forming cycle.

In most processes, prepared dough is loaded in a pizza pan of a given size and conformation and is subjected to two pressing or forming steps. After the first forming step, the formed dough is proofed. Then a second pressing or forming step and final proofing take place prior to baking in the oven. Proofing is a recognized term of the art relating yeast induced raising typically occurring in most bakery goods.

There are several recognized configurations for pizza crusts, the most popular being termed flat, lipped and deep dish. The primary distinction between these forms is the configuration of the outer rim of the crust. The configuration of the dough forming die face and the pan determines the particular configuration of the outer rim of the crust.

One of the problems which has not been satisfactorily solved with machine-made pizza crust manufacture is the formation of a highly visible, thin extension of the crust extending outward from the remaining portions of the outer rim thereof.

This thin ledge is present in prior art machine-made crusts and is caused by a small amount of dough not being contained between the die face plate, the sealing ring and the inner walls of the pan during the forming process. Due to its thin nature compared to the remaining portions of the outer lip of the crust, this small edge tends to be over browned during the baking process and sometimes forms a very hard, sharp edge, which may cause a slight cut or a painful or unpleasant sensation when the crust is eaten.

Further, the distinct over browning of this small ledge-like protrusion identifies a mass produced crust as compared to a hand-made crust. While this is not a sign of poor quality, some customers deem machine made crusts as less desirable than hand-made crusts.

Despite the ever increasing volume and demand in mass produced, machine-made crusts, the prior art has failed to provide a satisfactory solution to this problem and provide a die forming assembly which eliminates this excess crust line formation and provides a machine-made pizza crust which does not possess this heretofore prior visible difference compared to one which was hand-made.

SUMMARY OF THE INVENTION

The present invention relates generally to pizza crusts manufacturing processes and particularly to an improved dough die assembly which provides a positive seal between the dough forming die face and the sealing ring to prevent any dough from escaping the confining forming struction to form a hard over-browned ledge-like extension which forms a visually distinctive difference tending to identify the crust as being machined made versus being hand-made as well as potentially causing an unpleasant or painful sensation while eating the pizza.

In accordance with the present invention the dough forming die assembly is mounted to a vertically reciprocating base preferably driven by a hydraulic piston and cylinder assembly in a conventional manner.

The die assembly includes a base, a generally circular planar die face portion which is surrounded by a circumferentially extending recessed rim. Preferably the planar face is formed from stainless steel or aluminum and the recessed rim preferably is formed in a nylon backing plate which is mounted to the planar face portion. The surrounding recess is formed between an inner and outer wall. The outer wall terminates in a thin downwardly extending lip or tail which is conformed closely to fit within the upper portion of a sloping wall that is provided on the pizza pan and slideably engage with a cooperative lip or tail provided on the sealing ring as described below.

The cross-section of the recess is shaped in accordance with the particular shape of the outer lip of the pizza crust being formed. However, whatever the particular configuration of the desired lip to be formed in the pizza crust, the outer wall terminating in a thin lip or tail is always present.

The assembly also includes a cylindrical ring shaped sealing member which is mounted on the base for limited slidable movement between a raised and lowered position.

The sealing ring surrounds the dough forming die and its inner wall slideably engages the outer wall of the rim on the die face plate. The sealing ring includes a bottom edge provided with radius from an outer wall to an inner wall of the bottom edge. The radius forms a thin lip or tail portion on the inner wall of the bottom edge and is conformed to matingly engage the radius formed at the juncture of the walls of the pizza pan and the surrounding rim of the pan in a closely fit sealed relationship.

The sliding and sealed engagement between the lip of the dough forming die and the lip on the sealing ring at the end of the forming stroke in combination with the configuration of the radius on the bottom edge of the sealing ring provide a positive seal to maintain the dough which is being formed in the pan within the walls of the pizza pan and the recess formed in the rim of the dough forming die face. Therefore, no small portion of dough escapes to form a thin ledge or other visible identification that the crust was machine-made. Objects It is therefore an object of the present invention to provide a pizza crust dough forming die assembly of the type described wherein the pizza dough is confined in a positive sealed relationship within the configuration of the walls of the pizza pan and the recess formed in the dough forming die to eliminate any excessive thin ledge formation which generally distinguishes machine-made product from hand-made products.

It is a another object of the present invention to provide a dough forming die assembly of the type described wherein the positive seal formed between separate moving parts of the assembly does not nor otherwise require a change in the generally desired shape of the outer lip portion of the crust.

It is a further object of the present invention to provide a dough forming die assembly of the type described wherein the die face and sealing ring are modified in a relatively easily and inexpensively manner to accomplish the positive sealing relationship which provides the improved, desirable result.

Figure 1:
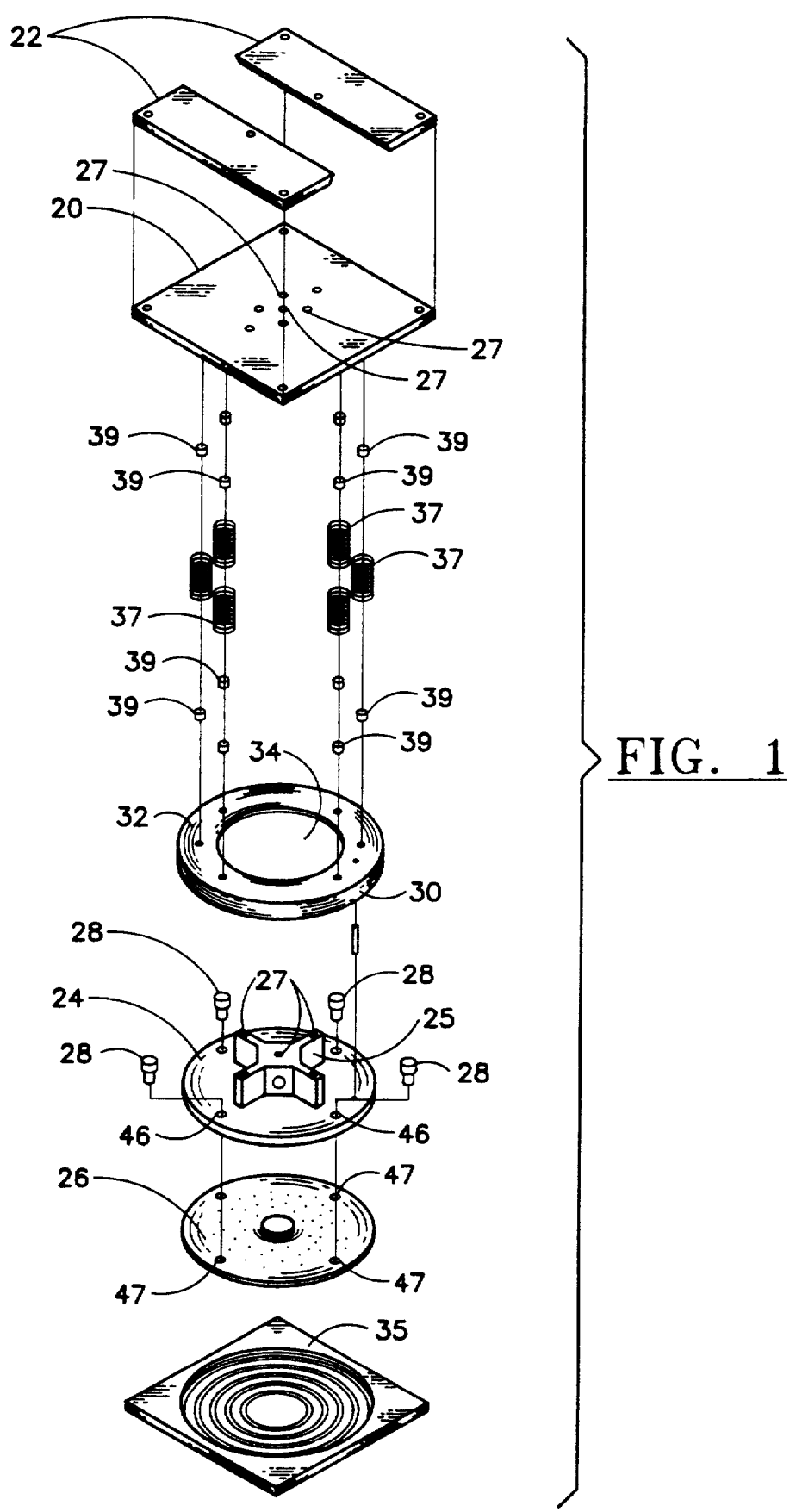
FIG. 1 is a perspective exploded view of a pizza crust dough forming die assembly illustrating a conventional arrangement of components of the assembly in which the novel sealing ring member and die face plate construction of the present invention may be used.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word connected or terms similar thereto are often used. They are not limited to direct connection but include connection through other elements where such connection is recognized as being equivalent by those skilled in the art.

DETAILED DESCRIPTION

A pizza crust dough forming die assembly constructed in accordance is shown in FIGS. 1-7 and may be employed in conventional single or multiple head pizza crust presses, not shown. The construction of pizza crust presses, typically employing hydraulic piston and cylinder assemblies to drive the vertical reciprocating cycle of the die assembly is well-known to those skilled in the art and therefore a detailed description thereof is not necessary to fully understand the present invention which is directed to novel improvements in the construction of the pressure or sealing ring member, the dough forming die face plate and the cooperative function between these components and the pizza crust pan.

As seen in the exploded view shown in FIG. 1, a dough forming die assembly typically includes a top plate 20 and a pair of gibs 22 which are bolted to the top plate 20 in a conventional manner. Gibs 22 may be conventionally connected to a parallel support, which in turn, is operably connected to a cylinder and piston arrangement for controlled vertical reciprocation of one or more die assemblies.

A base member 24 provided with an upwardly extending guide portion 25 is bolted in a conventional manner to top plate 20 via threaded holes 27 and conventional bolts, not shown. A die face plate, indicated generally at 26, is also fixed via face plate bolts such as 28 to the bottom surface of base member 24.

A hollow, cylindrical sealing ring 30 includes a top surface 32 provided with an opening 34 for receiving guide portion 25 of the base member 24. Base member 24 is slideably mounted in engagement with the inner walls 29 within sealing ring 30 for vertical movement between a fully raised and fully lowered position as best seen in FIGS. 2 and 3.

A conventional pan locator 35 is shown and forms a fixed component supported by the conventional structure of a pizza crust press, not shown. Pan locator 35 removably accepts and stabilizes a pizza crust pan 36 in an operable position as shown in FIGS. 2 and 3.

Figure 2:
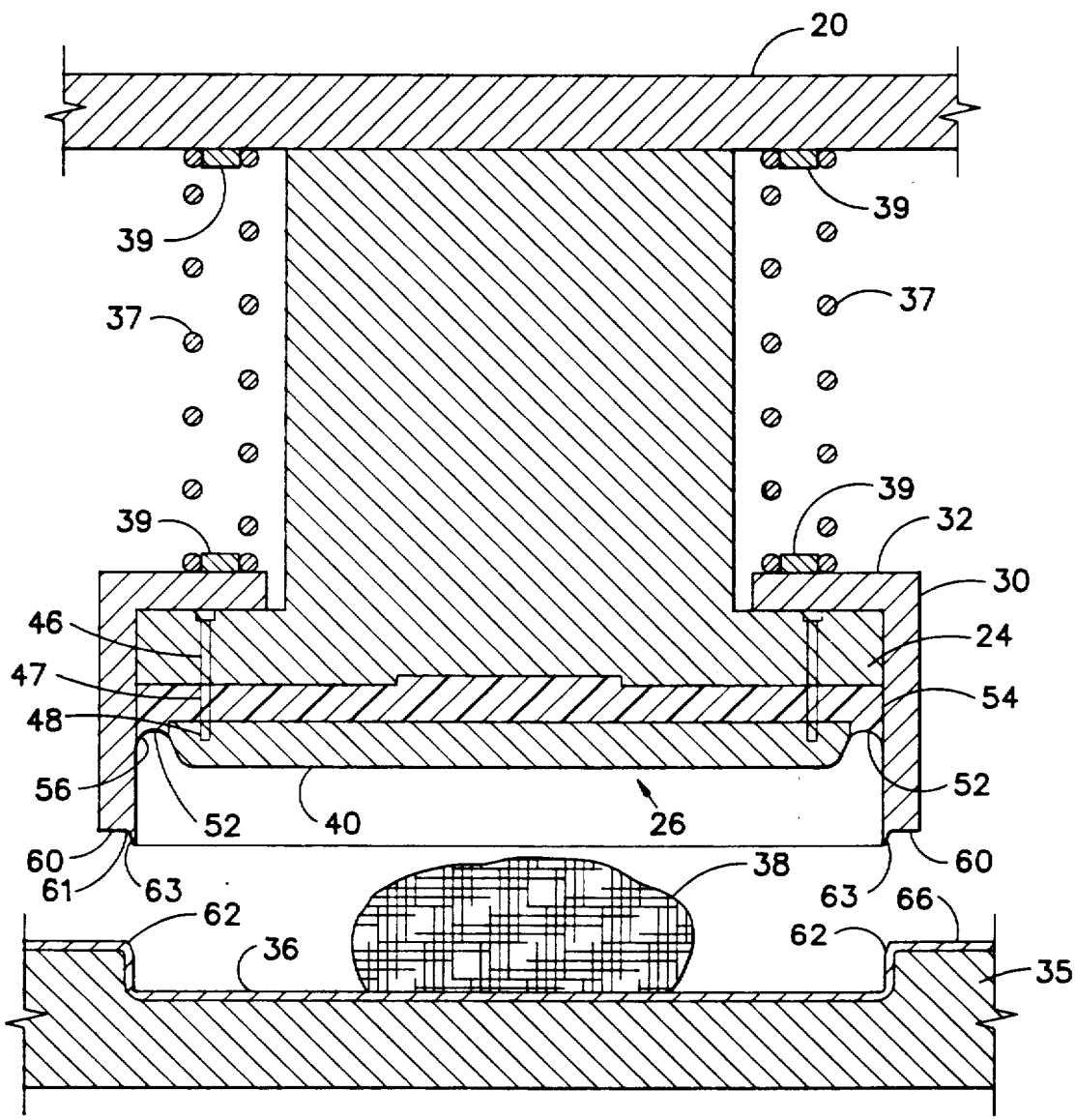
FIGS. 2 is a side elevational view of the assembly shown in FIG. 1 illustrating the sealing ring and die face plate in a raised position prior to contacting a portion of dough positioned on a conventional pizza crust pan.
Figure 3:
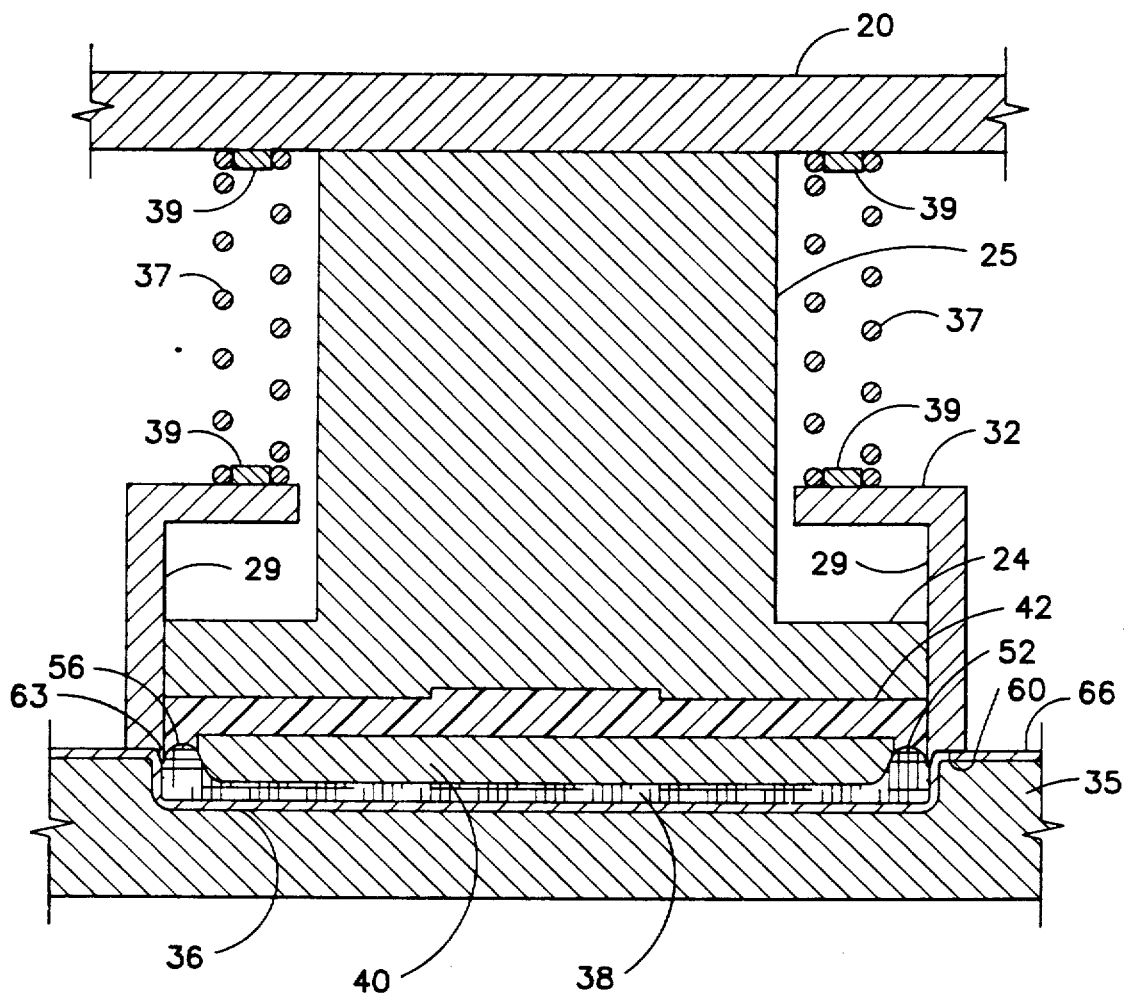
FIG. 3 is a side sectional view similar to that shown in FIG. 2 illustrating the sealing ring and die face plate in their lowered position engaging and forming the dough in the pan.

With specific reference to FIGS. 2 and 3, a pizza crust dough forming die assembly constructed in accordance with the present invention is illustrated in a fully raised position permitting a conventional pizza pan 36 carrying a prepared measured amount of dough 38 to be loaded onto pan locator 35.

In this raised or loading position, top plate 20 has been raised via the conventional operation of a piston and cylinder assembly in the same manner as is well known in the art. While only one die assembly head is shown, it is readily apparent to those skilled in the art that multiple die assemblies can be mounted to a platform in a planar relationship to simultaneously move a multiple arrangement of die head assemblies, each consisting of a top plate base, die face plate and sealing ring, into engagement with a respective one of aligned pans to produce multiple crusts with each cycle of the apparatus.

In the loading position, sealing ring 30 has been lifted away from pan 36 due to engaging the top surface 32 of base 24 against the downward biasing force of springs 37 which are disposed between top plate 20 and the upper surface 32 of ring 30. Springs 37 are mounted in a stable position between spring buttons 39 disposed on the underside of plate 20 and on top surface 32 of ring member 30.

Now referring to FIGS. 2-5, the details of die face plate 26 are shown. Die face plate 26 preferably consists of an aluminum or other suitable metal circular plate 40 provided with a nylon backing plate 42 which may be conventionally assembled to base 24 and plate 40 via threaded bolts 28 received in threaded bores 46 such as provided in base 24, holes 47 in plate 42 and threaded bores 48 in plate 40. While face plate 26 could be made in the same configuration in a one piece construction using one material, the metal and nylon two-piece construction shown is preferred for ease of manufacture.

Nylon plate 42 includes a circular recess 50 which accepts a portion of the depth of plate 40 and a recessed portion 52 forming a rim surrounding plate 40. The configuration of the recessed portion 52 determines the particular configuration of the outer lip or rim to be formed on the pizza crust, such as the typical styles referred to in the industry as flat, lipped, or deep dish.

Figure 4:
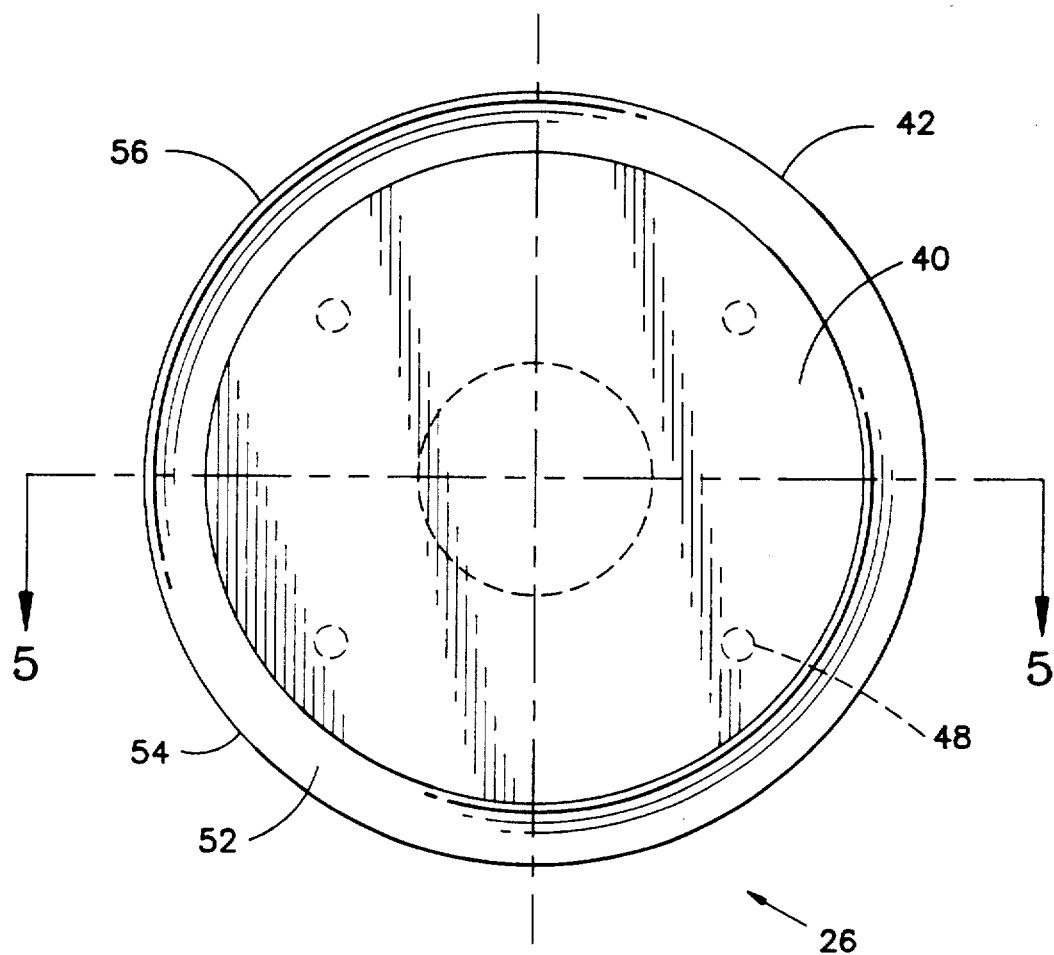
FIG. 4 is a top plan view illustrating the die face plate shown in the previous figures isolated from the remaining assembly components.
Figure 5:
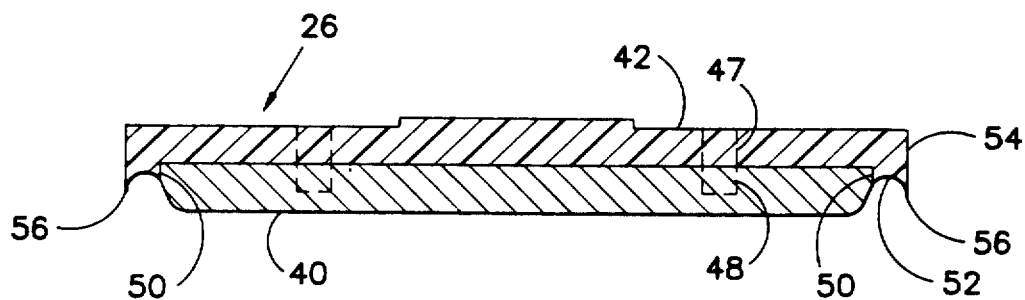
FIG. 5 is a side sectional view of the die face plate shown in FIG. 4, the section being taken along line 5—5 in FIG. 4.
Figure 6:
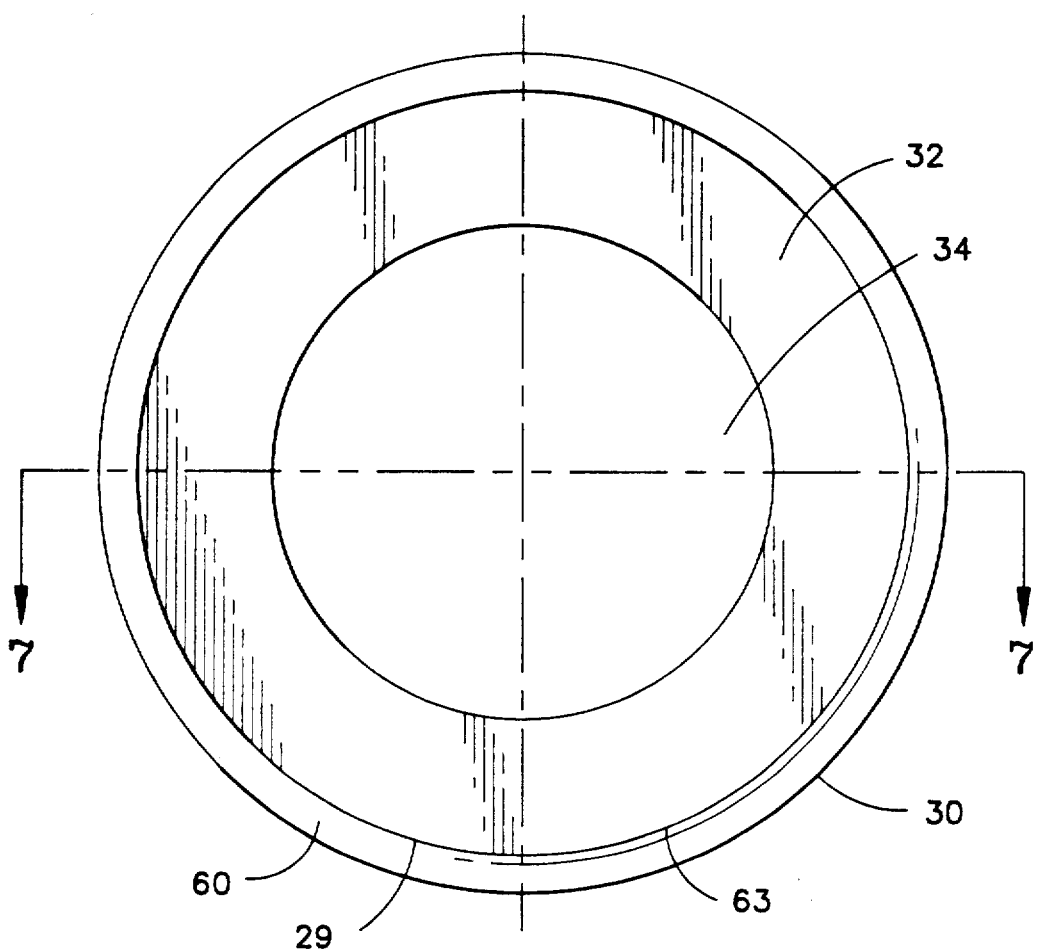
FIG. 6 is a top plan view of the sealing ring member shown in the preceding figures isolated from the remaining assembly components.
Figure 7:
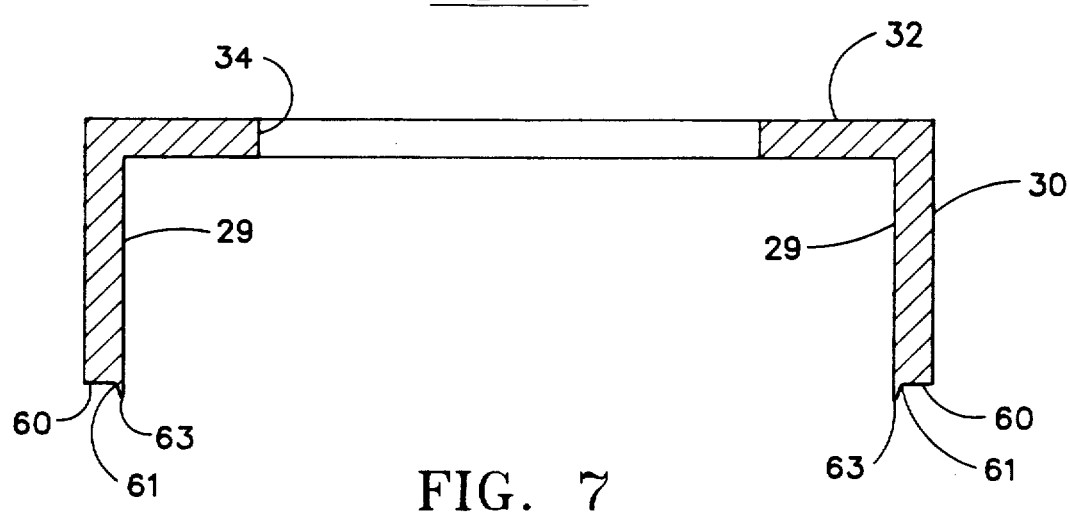
FIG. 7 is a side sectional view of the ring member shown in FIG. 6, the section being taken along line 7—7 in FIG. 6.

As shown in FIGS. 4 and 5, the configuration of recess 52 is shown in the lipped style. The outer wall 54 of recess 52 is provided with a downwardly extending lip or tail 56 terminating in a relatively thin edge. The inner wall closely engages the outer rim of plate 40 in a sealed relationship.

As seen in FIGS. 2 and 3, sealing ring 30 includes a bottom edge 60 provided with a curved surface 61 which mates with the curved upper edge 62 joining the upwardly sloping walls 64 and horizontally extending rim 66 of pan 36.

The curved surface of edge 60 terminates in a downwardly extending thin lip or tail 63 formed on the inner wall of edge 60.

The radius of curvature of surface 61 is conformed to closely match the radius of curvature of upper edge 62 of pan 36 such that edge 60 will seat in a close fit relationship with edge 62 and rim 66 of pan 36.

Now referring to FIGS. 2 and 3, the die assembly is shown in its lowered position wherein top plate 20, base 24 and die face plate 26 have been lowered to engage the dough 38. As top plate 20, base 24 and face plate 26 are lowered, sealing ring 30 is also lowered. However bottom edge 60 of sealing ring 30 engages the upper edge 62 and rim 66 of pizza pan 36 prior to the face plate 26 reaching the bottom of its stroke. Whereas the bottom edge 60 of sealing ring 30 engages pan 36, base 24 and face plate 26 slide along the inner walls 29 of sealing ring 30 until face plate 26 reaches the bottom of the downward stroke of the forming cycle. Spring 37 continuously urge sealing ring 30 downwardly to hold the engagement between bottom edge 60 and pan 36 until the upward stroke raises plate 20 and base 24 a predetermined distance again sliding engagement with walls 29 until base 24 engages the horizontal top portion 32 of sealing ring 30. Then sealing ring 30 is lifted against the force of springs 37 to the fully raised position shown in FIG. 2.

This distance sealing ring is raised is typically determined to merely provide sufficient clearance to remove pan 36 and permit a new pan carrying a measured amount of dough to be loaded onto pan locator 35.

During the downward stroke, bottom edge 60 engages rim 66 and curved edge 62 of pan 36, curved surface 61 closely mates with edge 62 and the lip or tail 63 slides into close fit engagement with the upper portions of walls 64 of pan 36 to form a tight sealing relationship around the perimeter of pan 36 and the bottom edge 60 of sealing ring 30. Since walls 64 are conventionally formed with a slight incline, usually about 5 degrees, the downward extent of tail 63 provides assurance of sealing engagement with the upper portion of walls 64. This permits some greater tolerance in the manufacture of the ring 30 while assuring a tight seal fit is obtained.

During this downward stroke, face plate 26 engages dough 38 and forces the dough to be pressed into the configuration of pan 36 and the reverse impression of face plate 26. As face plate 26 nears the bottom of its stroke, and outer wall 54 slides downwardly in engagement with the inner wall 29 of sealing ring 30, lip or tail 56 slideably engages and overlaps, at least a portion of tail 61.

This overlapping of tail 54 and tail 61 in close fit relationship further enhances the sealing efficiency to retain the dough being pressed upwardly and outwardly in pan 36 wholly within recess 52 of face plate 26, the tail 61 of sealing ring 30 and pan 36.

The dough, however, is forced to retain the desired shape having an outer rim portion which very closely conforms to the configuration of recess 52 and generally is provided with a continuous, relatively smooth, even contour showing no evidence of a ledge or part line between the separate parts of the dough forming assembly.

The result of using the die assembly of the present invention is readily noticeable in the finished product compared to those made using prior art die assemblies and provides the aesthetic appearance of being hand formed.

While certain preferred embodiments of the present invention have been disclosed in detail, it is to be understood that various modifications may be adopted without departing from the spirit of the invention or scope of the following claims.

We claim:

1. A dough forming die assembly for the manufacture of pizza crusts in cooperation with a size mated pizza pan of the conventional configuration having a central recess surrounded by upwardly sloping walls and a substantially horizontally extending, planar rim joined by a curved edge; said die assembly comprising
   (a) a vertically reciprocating base movable between a raised position and a lowered dough forming position;
   (b) a dough forming die face plate fixed to and movable with said base and provided with a generally planar face portion and a recessed rim surrounding said planar face portion for receiving formed dough at a height greater than the height of said horizontally extending planar rim of said pizza pan, said recessed rim having an outer wall terminating in a bottom edge provided with a convex curved surface defining a downwardly extending inwardly tapered lip; c) a hollow sealing member having a configuration generally conforming to the configuration of said base and said die face plate and mounted on said base for limited slidable movement relative to said base and said die face plate, said sealing member including an inner wall terminating in a bottom edge provided with a convex curved surface forming a downwardly extending outwardly tapered lip, said outwardly tapered lip of said sealing member including an inner wall portion slideably and sealingly engageable with an outer wall portion of said inwardly tapered lip formed on said recessed rim of said die face plate, said bottom edge of said sealing member including said outwardly tapered lip conformed to engage a portion of said sloping walls, said curved edge and said planar rim of said pizza pan in sealing relationship when said base is disposed in said lowered dough forming position.

* * * * *